United States Patent
Bhavsar et al.

(10) Patent No.: US 6,840,264 B1
(45) Date of Patent: Jan. 11, 2005

(54) FUEL TANK VENTING SYSTEM FOR REDUCED FUEL PERMEATION

(75) Inventors: Daven C. Bhavsar, Canton, MI (US); Robert J. Ginnard, Belleville, MI (US); Richard A. Knaggs, Ottawa Lake, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/640,600

(22) Filed: Aug. 13, 2003

(51) Int. Cl.[7] ................................................ F16K 24/04
(52) U.S. Cl. ........................................ 137/202; 137/587
(58) Field of Search ................................. 137/202, 587

(56) References Cited

U.S. PATENT DOCUMENTS

| | | |
|---|---|---|
| 6,189,567 B1 | 2/2001 | Foltz |
| 6,408,867 B2 | 6/2002 | Aoki et al. |
| 6,422,261 B1 | 7/2002 | DeCapua et al. |
| 6,591,857 B2 * | 7/2003 | Engle et al. ................ 137/202 |
| 2002/0011490 A1 | 1/2002 | Nakamura et al. |
| 2002/0096522 A1 | 7/2002 | Palvoelgyi et al. |
| 2003/0062083 A1 | 4/2003 | Nishi et al. |

* cited by examiner

Primary Examiner—Gerald A. Michalsky
(74) Attorney, Agent, or Firm—Brinks Hofer Gilson & Lione

(57) ABSTRACT

The present invention involves a venting system for venting a gaseous fluid from a tank having an aperture and a fuel delivery module cover. The tank is made of a predetermined material. The venting system comprises a venting valve for venting gaseous hydrocarbon fluid at a predetermined pressure from the tank. The valve is disposed through the aperture to define a circumferential space between the inner side of the outer lip and the venting valve. The system further includes a cover comprising the predetermined material and attached to the outer layer to seal the valve between the cover and the outer layer. The system further includes a retention member disposed about the venting valve and attached to the outer layer about the outer side of the outer lip defining an expansion boundary so that the outer lip only expands toward the venting valve to seal the circumferential space when the tank absorbs hydrocarbons.

24 Claims, 3 Drawing Sheets

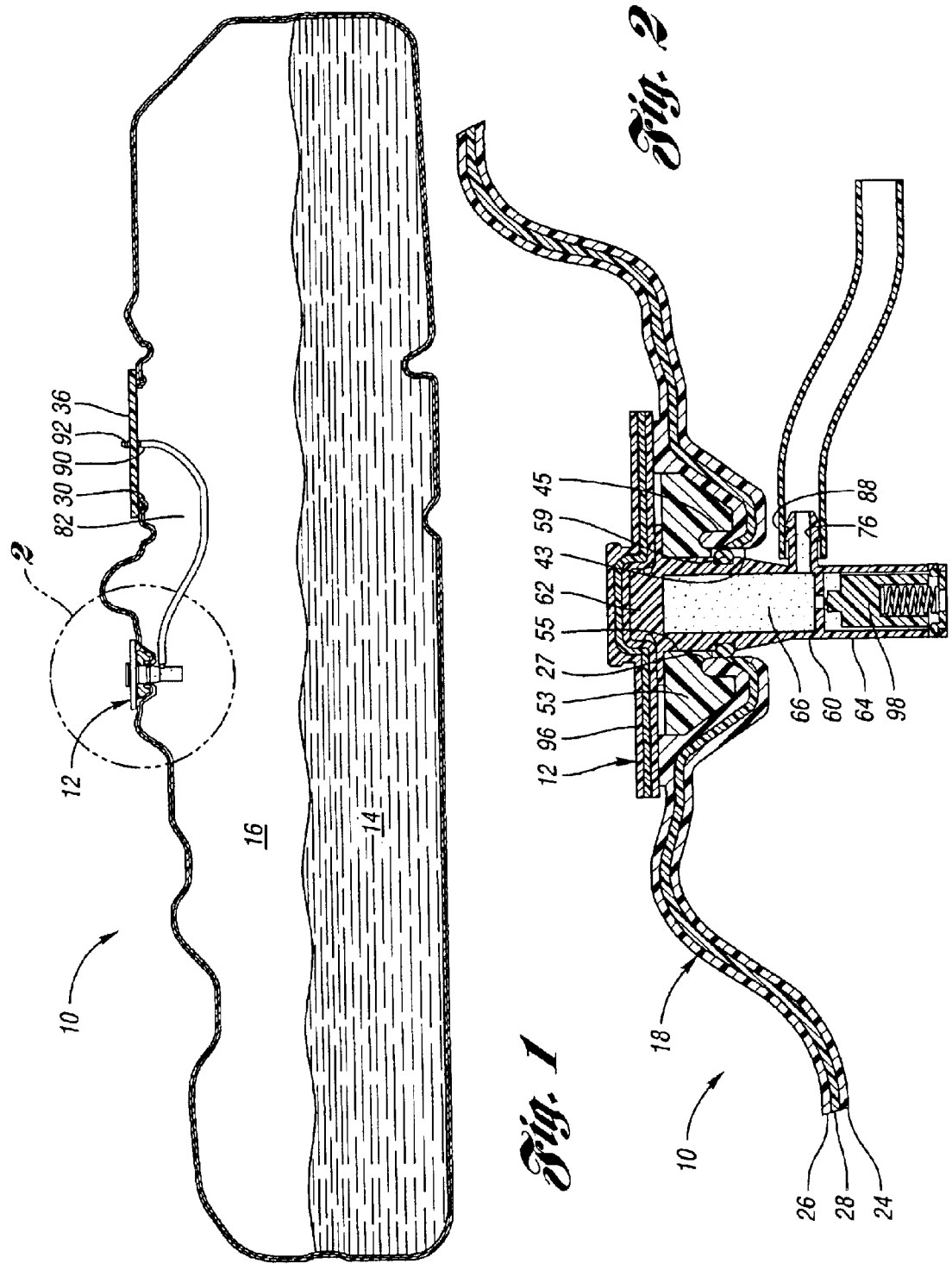

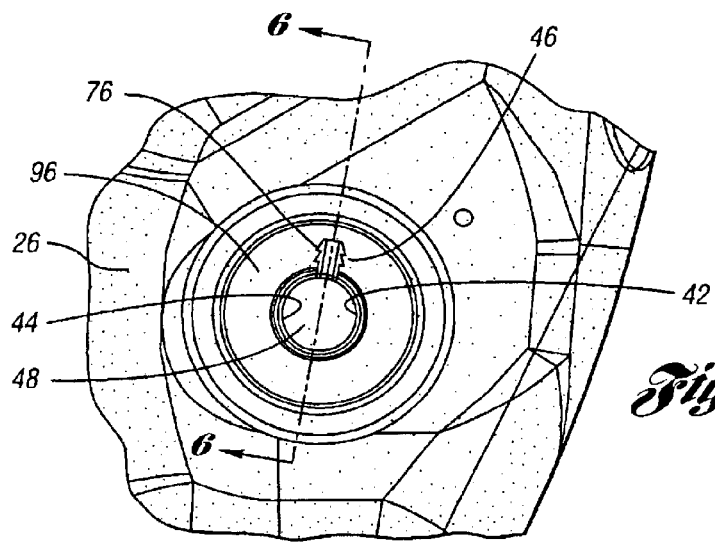
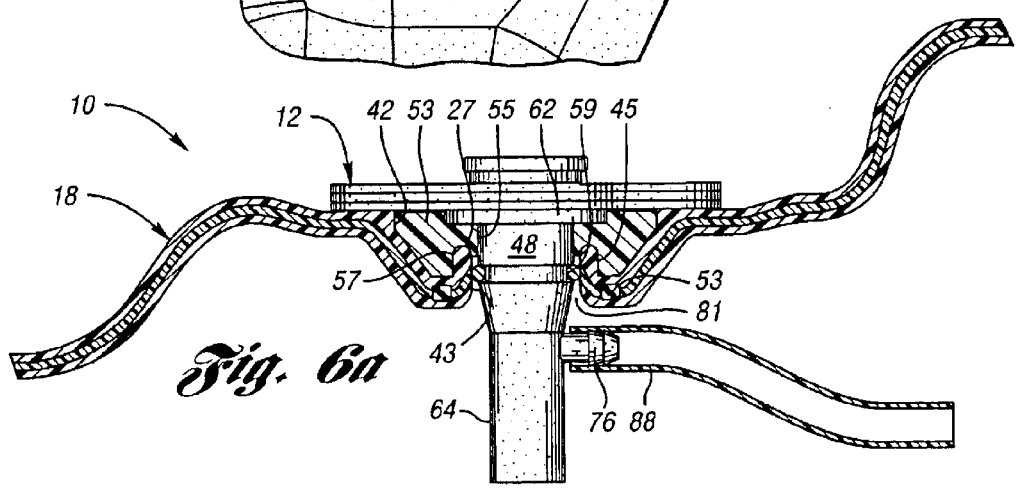
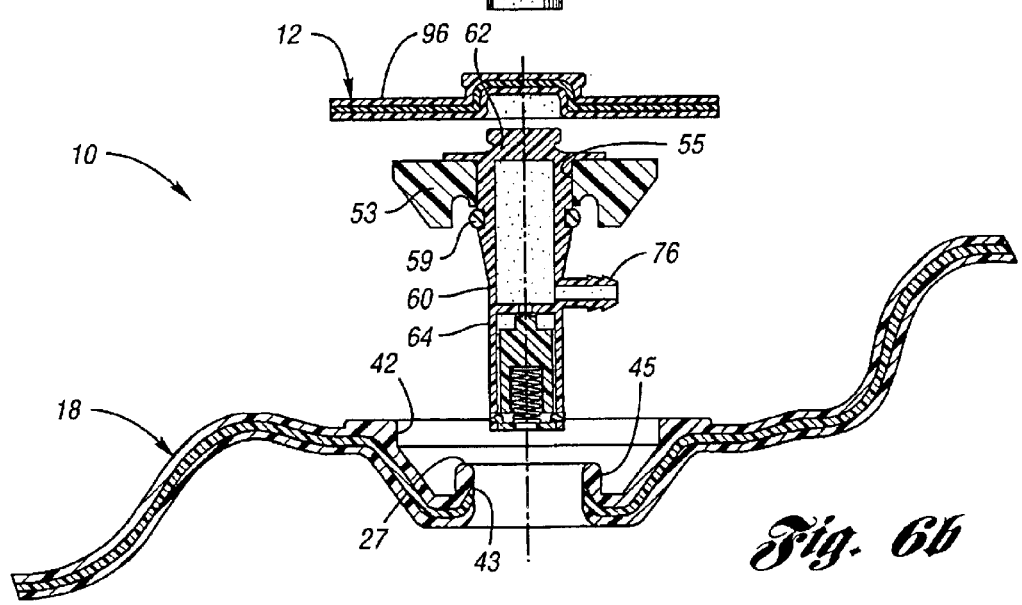

FUEL TANK VENTING SYSTEM FOR REDUCED FUEL PERMEATION

BACKGROUND OF THE INVENTION

The present invention relates to a fuel tank having a venting system for reduced fuel permeation.

Blow-molded fuel tanks are known and have been widely used in industries such as the automotive industry. Vapor valving is a common way of venting a gaseous fluid at a particular pressure from a blow-molded fuel tank containing liquid and gaseous contents. In many venting systems of blow-molded fuel tanks, a gaseous fluid is vented through a typical venting valve which is disposed within a surface or tank shell of the tank of a vehicle. The gaseous fluid flows through a connection port of the valve, wherein the port is located outside the tank during operation of the valve. The connection port is in fluid communication with a permeation barrier hose through which the gaseous fluid flows to be received in a separate vapor canister within the vehicle for further processing.

The above-mentioned system is adequate but can be improved. For instance, the venting valve, which typically is made of a different material than the tank shell, is welded to attach to the tank shell with a permeation barrier material, e.g., nylon. This creates a weld having two different coefficients of thermal expansion, wherein surface contact is typically continuously maintained. In many situations, this often results in delamination of the materials from each other.

Moreover, current fuel tank configurations may be prone to fuel permeation during use. That is, when the tank contains hydrocarbons therein, hydrocarbon absorption occurs within layers of the shell, creating hydrocarbon "swelling" of the tank. As a result, the aperture through which the venting valve is disposed expands due to the absorption of hydrocarbons and the hydrocarbon swelling of the tank. In many situations, the swelling opens a path of hydrocarbon permeation through the tank to the atmosphere. However relatively small, this too is undesirable.

In addition, the cost of such venting system is relatively high, since materials required to manufacture or purchase the permeation barrier hose is relatively expensive. Such permeation barrier hose may comprise a significant portion relative to the entire cost of manufacturing the venting system.

SUMMARY

The present invention generally is a fuel tank having a valve assembly for reduced fuel permeation through an outer lip defining an aperture of the tank and the venting valve. A retention member is attached to the outer lip to define an expansion boundary so that the outer lip only expands toward the venting valve to restrict hydrocarbon permeation therethrough.

In one embodiment, the fuel tank includes a tank shell having an outer layer and an outer lip extending outwardly from the outer layer. The outer lip defines an aperture formed through the tank shell and has inner and outer sides. The tank shell includes a fuel delivery module cover exposed thereon, the tank shell comprises a predetermined material. The fuel tank further includes a venting valve for venting a gaseous hydrocarbon fluid at a predetermined pressure from the tank. The valve is disposed through the aperture to define a circumferential space between the inner side of the outer lip and the venting valve. The fuel tank further includes a channel having first and second ends, wherein the first end is connected to the venting valve within the tank so that the venting valve within the tank so that the venting valve is in fluid communication therewith when the valve vents fluid. The second end is attached to the fuel delivery module cover to allow fluid in the tank to be vented therefrom.

In this embodiment, the fuel tank further includes a retention member disposed about the venting valve and attached to the outer layer about the outer side of the outer lip. This defines an expansion boundary so that the outer lip only expands toward the venting valve to seal the circumferential space when the tank absorbs hydrocarbons. The tank further includes a cover comprising the predetermined material and attaches to the outer layer to seal the valve between the cover and the outer layer.

In another embodiment, the present invention provides a venting assembly for venting a gaseous fluid from a fuel tank having an outer layer and a fuel delivery module cover. The venting assembly comprises an outer lip extending outwardly from the outer layer to define an aperture formed through the tank shell. The outer lip has inner and outer sides. The venting assembly further comprises a venting valve for venting a gaseous hydrocarbon fluid at a predetermined pressure from the tank. The valve is disposed through the aperture to define a circumferential space between the inner side of the outer lip and the venting valve. The assembly further comprises a cover attached to the outer layer to seal the valve between the cover and the outer layer.

The assembly further includes a retention member disposed about the venting valve and attached to the outer layer about the outer side of the outer lip defining an expansion boundary so that the outer lip only expands toward the venting valve to seal the circumferential space when the tank absorbs hydrocarbons.

Further objects, features and advantages of the invention will become apparent from consideration of the following description and the appended claims when taken in connection with the accompanying drawings.

BRIEF DESCRIPTION OF THE DRAWINGS

FIG. 1 is a cross-sectional side view of a fuel tank having a venting system in accordance with one embodiment of the present invention;

FIG. 2 is an enlarged view of the venting system in circle 2 of FIG. 1 in accordance with one embodiment of the present invention;

FIG. 5 is a partially broken-away top view of the fuel tank having the venting system;

FIG. 6a is a side view of the venting system in FIG. 5; and

FIG. 6b is an exploded cross-sectional view of the venting system in FIG. 5 taken along lines 6—6.

DETAILED DESCRIPTION OF THE INVENTION

Figure 3:
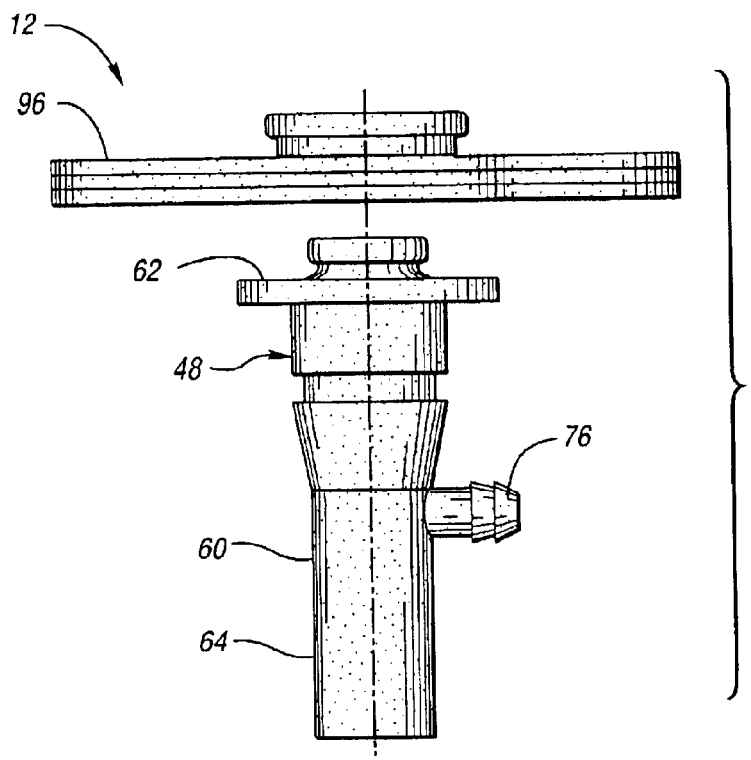
FIG. 3 is a side view of a venting valve and a sealing cover of the venting system in FIG. 2.

The present invention generally provides a venting system for venting a gaseous fluid from a fuel tank to reduce the risk of undesired exposure of gaseous hydrocarbon fluid to the atmosphere and eliminates a need of a costly permeation barrier hose typically used in vapor venting. The venting system generally provides a venting valve and a retention member disposed through an aperture formed through the fuel tank and sealed by welding a cover to the tank. The aperture of the tank is defined by an outer lip configured to receive the retention member such that the retention member serves as an immoveable boundary preventing the aperture from expanding. This allows compression of the outer lip and the venting valve thereby creating an enhanced seal to further reduce gaseous hydrocarbon fluids from escaping to the atmosphere.

FIG. 1 illustrates a fuel tank 10 having a venting system or assembly 12 for reduced fuel permeation from the tank 10. As shown, tank 10 includes venting assembly 12 for venting a gaseous fluid from the tank 10 containing liquid and gaseous fluids 14, 16. Liquid and gaseous fluids 14, 16 may be any fluid used in vehicle fuel tanks as known in the art, e.g., gasoline. As shown in FIG. 2, fuel tank 10 includes tank shell 18 having inner and outer layers 24, 26 and an ethylene vinyl alcohol (EVOH) layer 28 which is co-extruded between inner and outer layers 24, 26 preferably but not necessarily by a blow molding process. Inner and outer layers 24, 26 may be made of high density polyethylene. However, it is understood that the inner and outer layers of the tank shell may be made of any other suitable plastic material without falling beyond the scope or spirit of the present invention. Tank shell 18 further includes hole 30 formed therethrough and is configured so that fuel delivery module cover 36 may be removably inserted into hole 30 to attach to tank shell 18.

In this embodiment, fuel tank 10 is preferably but not necessarily a fuel tank for a vehicle. However, it is understood that the fuel tank mentioned in this embodiment of the present invention may include any size vehicle tanks, storage tanks, or any other suitable tank without falling beyond the scope or spirit of the present invention.

FIGS. 2, 6a, and 6b depict tank shell 18 further including an outer lip 27 extending outwardly from the tank shell 18. As shown, the inner and outer layers 24, 26 cooperate to form the outer lip 27. The outer lip 27 defines an aperture 42 formed through the tank shell 18 and has inner and outer sides 43, 45 extending outwardly from the tank shell 18.

FIGS. 2–4 and 6a–6b depict a retention member 53 formed on the outer layer 26 of the tank shell 18 and cooperates with the outer lip 27. As shown, the retention member 53 has a bore 55 formed therethrough which is in alignment with the aperture 42 of the tank shell 18. The retention member 53 is made of material having a lower rate of hydrocarbon absorption than the material (e.g. HDPE) comprising the tank shell 18. For example, the retention member 53 may be made of any suitable metal or metal alloy such as aluminum or aluminum alloy.

Preferably, the retention member 53 receives the outer lip 27 and is attached to the outer layer 26 about the outer side 45 and partially engaged with the inner side 43 of the outer lip 27. This may be accomplished by any suitable means, such as injection molding the tank shell with the retention member. As a result, the retention member 53 serves as an expansion boundary against the outer lip 27, preventing the outer lip 27 from expanding outwardly thereby increasing the aperture size when hydrocarbon swelling occurs during normal use of the tank. Rather, the outer lip 27 is configured to expand inwardly during hydrocarbon absorption of the tank, since the retention member 53 provides the outer lip 27 with only an inward radial direction of expansion when hydrocarbon absorption occurs.

As shown in FIG. 6a, the tank shell 18 is configured to be integrated with or formed within the retention member 53 so that disengagement of the retention member 53 from the tank shell 18 is avoided. In this embodiment, the retention member 53 is structurally configured to allow tank shell 18 to be injection molded within the retention member 53, thereby securing the retention member 53 with the tank shell 18. It is to be understood that the retention member 53 may take on any suitable structural configuration to allow the tank shell 18 to be formed within the retention member 53, thereby maintaining attachment of the retention member to the tank shell.

As shown, venting valve 48 is disposed through the bore 55 of the retention member 53 and rests thereon such that the venting valve 48 is suspended within the retention member 53 in the fuel tank. In this embodiment, bore 55 is defined by a circular portion 44. As shown in this embodiment, bore 55 is formed in a shape of a typical key hole. However, as described in greater detail below, bore 55 may be formed of any other suitable shape. As mentioned above, the venting valve 48 is disposed through the bore 55 and is received by the retention member 53 to define a circumferential space 81 between the inner side 43 of the outer lip 27 and the venting valve 48. Thus, the retention member 53 is situated about the outer side 45 of the outer lip 27 defining an expansion boundary 57 so that the outer lip 27 only expands toward the venting valve 48 to seal the circumferential space when the tank absorbs hydrocarbons.

Venting valve 48 includes valve body or housing 60 having top portion 62 and neck portion 64 extending from top portion 62. As shown, neck portion 64 includes a radial wall integrally extending from top portion 62 to define an inner space 66 in neck portion 64 in which spring and float assembly 98 is housed as discussed below. As shown, port 76 extend from neck portion 64, wherein port 76 is disposed below top portion 62. Neck portion 64 engages retention member 53 in circle portion 44. As shown, neck portion 64 is configured to have dimensions or a shape complementing but slightly greater than circle portion 44. This allows neck portion 64 to be frictionally retained in circle portion 44.

As shown, top portion 62 is shaped to complement the top surface of the retention member 53 to prevent radial movement of the valve 48 when suspended in bore 55. However, it is to be understood that the complementing shapes of the top portion and the top surface of the retention member may take on any other suitable configuration to prevent the valve 48 from radial movement when suspended in the bore. It is also to be understood that the venting assembly may not be drawn to scale in the figures relative to the tank shell and the aperture. Thus, for example, the neck portion of the venting valve may be inserted through the aperture at an angle.

As shown, port 76 is in fluid communication with inner space 66. Venting system 12 includes internal hose or channel 82 having first and second ends 88, 90, wherein first end 88 attaches to port 76 and second end 90 attaches to coupling 92 of fuel delivery module cover 36 so that port 76 is in fluid communication with coupling 92. In this embodiment, the gaseous fluid is vented to flow to a separate system, e.g., a vapor canister (not shown), within the vehicle for further processing. This allows channel 82 to be in fluid communication with venting valve 48 so that the gaseous fluid may be vented from tank 10 to the vapor canister separate from the tank.

Port 76 may be formed at any suitable location along neck portion 64. Additionally, it is understood that, although the port is shown to have a male nozzle or barbed configuration, the port may be configured to have any other connection without falling beyond the scope or spirit of the present invention. For example, the port may have a male quick connection fit and the internal hose may have a corresponding female quick connection fit.

As shown in FIGS. 2 and 6b, valve body 60 includes a typical spring and float assembly 98 housed within inner space 66. Spring and float assembly 98 allows venting valve 48 to vent gaseous fluids at a predetermined pressure, e.g., about 1.0 to 3.0 pounds per square inch gauge or about 30 to 60 inches water, without venting liquid fluid therefrom. In this embodiment, valve body 60 of venting valve 48 includes a spring and float assembly housed therein as a mechanism for allowing gaseous fluids to be vented. However, any other suitable mechanisms known in the art may be used to vent gaseous fluids from the fuel tank. For example, the valve body may include a grade venting, rollover, fill limit/vent, or shutoff mechanism. It is understood that, although a pressure range at which the valve vents the gaseous fluid has been discussed above, a more broad range may be used without falling beyond the scope or spirit of the present invention. Also, it is to be noted that spring and float assembly 98 may not be drawn to scale.

In this embodiment, the venting valve 48 further includes a sealing gasket 59 disposed about valve notch 61 formed about venting valve 48. As shown in FIG. 2, the sealing gasket 59 engages the inner side 43 of the outer lip 27 to further define the circumferential space between the outer lip 27 and venting valve 48. However, it is to be noted that this merely is a preferred embodiment and thus, other suitable means may be used without falling beyond the scope or spirit of the present invention.

Figure 4:
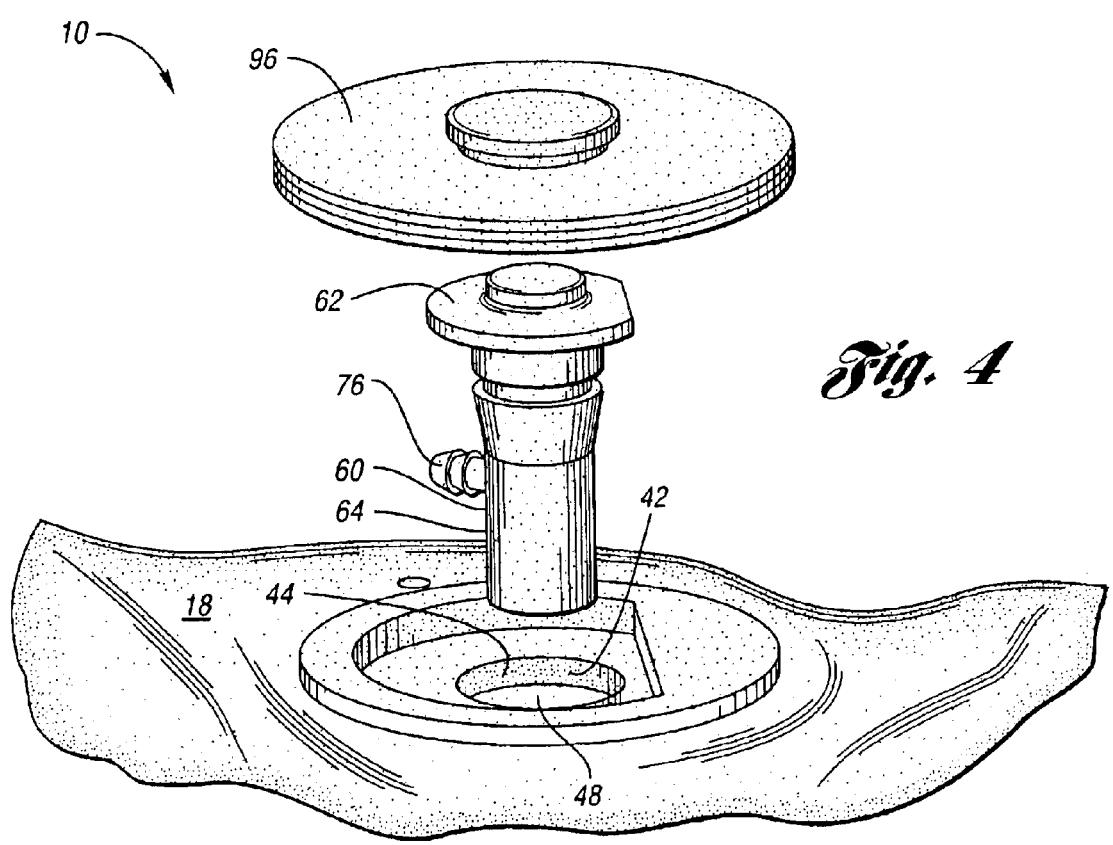
FIG. 4 is a perspective environmental view of the venting valve depicted in FIG. 3.

As shown in FIGS. 2 and 4, sealing cover 96 is mounted onto outer layer 26 of tank shell 18. Sealing cover 96 preferably but not necessarily has corresponding inner and outer layers made of the same material as inner and outer layers 24, 26 of tank shell 18 and has an EVOH layer disposed there between by blow molding. Thus, sealing cover 96 and tank shell 18 have substantially the same coefficients of thermal expansion. Sealing cover 96 may be attached to outer layer 26 by any suitable means. In this embodiment, cover 96 is welded onto outer layer 26 by a permeation barrier material to seal top portion 62 of valve 48 between outer layer 26 and cover 96. As shown, the valve of this embodiment of the present invention is separate from the sealing cover which is welded onto the outer layer. Thus, the valve is not required to be in continuous surface contact with the cover, although the cover may merely engage the top portion of the valve.

In use, the retention member is molded with the outer layer of the tank shell such that the retention member maintains its attachment with the outer layer of the tank shell. Moreover, the retention member is disposed about the venting valve and outer lip of the tank shell such that a boundary is created against the outer lip defining an expansion boundary. As a result, the aperture will only expand inwardly thereby closing the circumferential space between the inner side of the outer lip and the venting valve, when the tank shell absorbs hydrocarbon and "swells." This provides an enhanced and improved seal, reducing fuel permeation therethrough.

It is to be noted that, whether the sealing cover is welded directly onto the tank shell or with a permeation barrier material, the coefficients of thermal expansions are the same, since the sealing cover and the tank shell are of the same material. It has been found that the sealing cover being made of the same materials as the tank shell significantly reduces the sheer stresses in the permeation barrier materials. In turn, it has been determined that this reduces the risk of delamination of the welded materials.

While the present invention has been described in terms of preferred embodiments, it will be understood, of course, that the invention is not limited thereto since modifications may be made to those skilled in the art, particularly in light of the foregoing teachings.

What is claimed is:

1. A fuel tank having a valve assembly for reduced fuel permeation, the fuel tank comprising:

a tank shell having an outer layer and an outer lip extending outwardly from the outer layer, the outer lip defining an aperture formed through the tank shell and having inner and outer sides, the tank shell including a fuel delivery module cover disposed thereon, the tank shell comprising a predetermined material;

a venting valve for venting a gaseous hydrocarbon fluid at a predetermined pressure from the tank, the valve being disposed through the aperture to define a circumferential space between the inner side of the outer lip and the venting valve;

a channel having first and second ends, the first end connecting to the venting valve within the tank so that the venting valve is in fluid communication therewith when the valve vents fluid, the second end being attached to the fuel delivery module cover to allow fluid in the tank to be vented therefrom;

a retention member disposed about the venting valve and attached to the outer layer about the outer side of the outer lip defining an expansion boundary so that the outer lip only expands toward the venting valve to seal the circumferential space when the tank absorbs hydrocarbons; and a cover comprising the predetermined material and attached to the outer layer to seal the valve between the cover and the outer layer.

2. The fuel tank of claim 1 wherein the tank shell has an inner layer, the inner and outer layers cooperating to form the outer lip.

3. The tank of claim 2 wherein the inner and outer layers of tank shell are made of a high density thermoplastic.

4. The tank of claim 2 wherein the tank shell further includes a middle barrier layer disposed between the inner and outer layers.

5. The fuel tank of claim 1 wherein the venting valve includes a valve body having a top portion and a neck portion integrally extending from the top portion to define the circumferential space.

6. The fuel tank of claim 5 wherein the neck portion has a port extending from the neck portion.

7. The fuel tank of claim 6 wherein the top portion engages the retention member to suspend the venting valve in the tank.

8. The fuel tank of claim 7 wherein the aperture is defined by a first portion, the neck portion of the valve body engaging the tank shell in the first portion.

9. The tank of claim 8 wherein the first portion is a circular portion, the neck portion being configured to have dimensions complementing the circle portion.

10. The tank of claim 6 wherein the port is a male nozzle and the channel is a tube having a female end disposed about the port.

11. The fuel tank of claim 1 further comprising a permeation barrier material welded between the cover and the outer layer of the tank shell.

12. The fuel tank of claim 11 wherein the outer layer and the cover have substantially the same coefficients of expansion.

13. The fuel tank of claim 11 wherein the permeation barrier material is nylon.

14. A venting assembly for venting a gaseous fluid from a fuel tank having an outer layer and a fuel delivery module cover, the venting assembly comprising:

an outer lip of the fuel tank extending outwardly from the outer layer, the outer lip defining an aperture formed through the tank shell and having inner and outer sides;

a venting valve for venting a gaseous hydrocarbon fluid at a predetermined pressure from the tank, the valve being disposed through the aperture to define a circumferential space between the inner side of the outer lip and the venting valve;

a cover attached to the outer layer to seal the valve between the cover and the outer layer; and a retention member disposed about the venting valve and attached to the outer layer about the outer side of the outer lip defining an expansion boundary so that the outer lip only expands toward the venting valve to seal the circumferential space when the tank absorbs hydrocarbons.

15. The assembly of claim 14 wherein the venting valve includes a valve body having a top portion and a neck portion integrally extending from the top portion to define the circumferential space.

16. The assembly of claim 15 wherein the neck portion has a port extending from the neck portion.

17. The assembly of claim 16 wherein the top portion engages the retention member to suspend the venting valve in the tank.

18. The assembly of claim 17 wherein the aperture is defined by a first portion, the neck portion of the valve body engaging the tank in the first portion.

19. The assembly of claim 18 wherein the first portion is a circular portion, the neck portion being configured to have dimensions complementing the circular portion.

20. The assembly of claim 16 wherein the port is a male nozzle and the channel is a tube having a female end disposed about the port.

21. The assembly of claim 14 further comprising a permeation barrier material welded between the cover and the tank.

22. The assembly of claim 21 wherein the permeation barrier material is nylon.

23. The assembly of claim 14 wherein the tank is made of a high density thermoplastic.

24. The assembly of claim 14 wherein the tank includes a middle barrier layer disposed between inner and outer layers.

* * * * *